United States Patent
Garcia Garcia et al.

(10) Patent No.: US 8,448,257 B2
(45) Date of Patent: May 21, 2013

(54) METHOD AND SYSTEM FOR CONTROLLING CONTEXT-BASED WIRELESS ACCESS TO SECURED NETWORK RESOURCES

(75) Inventors: Laura Garcia Garcia, Madrid (ES); Ariel Hernandez Hernandez, Madrid (ES); José Enrique Lopez Garcia, Madrid (ES); Pedro Luis Muñoz Organero, Madrid (ES)

(73) Assignee: Telefonica, S.A., Madrid (ES)

( * ) Notice: Subject to any disclaimer, the term of this patent is extended or adjusted under 35 U.S.C. 154(b) by 95 days.

(21) Appl. No.: 13/125,065

(22) PCT Filed: Oct. 21, 2009

(86) PCT No.: PCT/ES2009/070447
§ 371 (c)(1),
(2), (4) Date: Jun. 8, 2011

(87) PCT Pub. No.: WO2010/046515
PCT Pub. Date: Apr. 29, 2010

(65) Prior Publication Data
US 2011/0239276 A1    Sep. 29, 2011

(30) Foreign Application Priority Data
Oct. 22, 2008    (ES) .................................. 200802990

(51) Int. Cl.
*H04L 29/06*    (2006.01)
*G06F 15/16*    (2006.01)

(52) U.S. Cl.
USPC .................................. 726/27; 726/5; 709/229

(58) Field of Classification Search
None
See application file for complete search history.

(56) References Cited

U.S. PATENT DOCUMENTS

| | | | | |
|---|---|---|---|---|
| 6,092,199 | A * | 7/2000 | Dutcher et al. | 726/4 |
| 6,470,453 | B1 * | 10/2002 | Vilhuber | 726/4 |
| 6,748,543 | B1 * | 6/2004 | Vilhuber | 726/8 |
| 2003/0018915 | A1 * | 1/2003 | Stoll | 713/201 |
| 2006/0230438 | A1 * | 10/2006 | Shappir et al. | 726/8 |
| 2007/0168870 | A1 * | 7/2007 | Wada | 715/741 |
| 2007/0186273 | A1 * | 8/2007 | Carpy et al. | 726/2 |
| 2008/0167994 | A1 * | 7/2008 | Li et al. | 705/52 |

FOREIGN PATENT DOCUMENTS

EP    1 720 370 A1    11/2006

OTHER PUBLICATIONS

A. Hernandez Hernandez et al., "Nuevo sistema de autenticacion y autorizacion Wi-Fi basado en localizacion en interiores para entornos seguros", *XXII Congreso URSI 2007: Simpsosium Nacional De La Union Cientifical Internacional De Radio* (2007). (English Abstract on first page).

C. Rigney Livingston, "Network Working Group Request for Comments: 2866, Category: Informational, Obsoletes: 2139", (2002).

(Continued)

*Primary Examiner* — Christopher Revak
(74) *Attorney, Agent, or Firm* — Ostrolenk Faber LLP (57) ABSTRACT

Information on the identity of each user connecting via a wireless device is obtained using a prior process of authentication and context information and/or the status of the user; a characteristics vector is generated for each user, which comprises the context information and/or the user status and a user profile. Permissions are assigned to each user, determining the type of secured network resources each user is permitted to access, depending on their characteristics vector; and a secured-network-resource access check is performed, enabling the transfer of data only to/from resources permitted for each user, as a function of the permissions assigned.

18 Claims, 5 Drawing Sheets

OTHER PUBLICATIONS

R. Aboba et al., "Network Working Group Request for Comments: 3748, Obsoletes: 2284, Category: Standards Track" (2004).

IEEE Computer Society, "Part 11: Wireless LAN Medium Access Control (MAC) and Physical Layer (PHY) specifications; Amendment 6: Medium Access Control (MAC) Security Enhancements", *IEEE Standard for Information technology—Telecommunications and information exchange between systems—Local and metropolitan area networks—Specific requirements,* (2004).

International Search Report dated Jan. 25, 2010.

* cited by examiner

METHOD AND SYSTEM FOR CONTROLLING CONTEXT-BASED WIRELESS ACCESS TO SECURED NETWORK RESOURCES

CROSS REFERENCE TO RELATED APPLICATIONS

The present application is a 35 U.S.C. §371 National Phase conversion of PCT/ES2009/070447, filed Oct. 21, 2009, which claims benefit of Spanish Application No. P200802990, filed Oct. 22, 2008, the disclosure of which is incorporated herein by reference. The PCT International Application was published in the Spanish language.

TECHNICAL FIELD

The described invention belongs to the sector of wireless communications, specifically to the security and controlling access to network resources through wireless networks.

DESCRIPTION OF THE RELATED ART

The broad deployment and enormous success of wireless networks, and specifically Wi-Fi networks, has also led to a growing development and number of attacks which have demonstrated several weaknesses of networks of this type.

Some of the main problems which general access networks must face are the secure identification of users making use of said networks. Combined with this, there is also a characteristic inherent to wireless technologies; the absence of a physical connection point to the network, which entails an added risk for systems that can be accessed from it as it provides the access with certain invisibility. Several solutions for the authentication and encrypting in Wi-Fi networks which allow improving the confidentiality, integrity and authentication therein have been proposed. Among such proposals, it is necessary to mention the WEP (Wired Equivalent Privacy) security mechanism published by IEEE (which has been widely adopted though it has already been demonstrated that the breach thereof is possible and relatively simple). To solve the deficiencies in WEP, the IEEE started to develop of a new security standard known as 802.11i. Furthermore, the manufacturers of WLAN technologies, under the Wi-Fi Alliance, developed an intermediate transitional security mechanism until 802.11i is ready. This solution is known as WPA (Wi-Fi Protected Access).

Despite all these efforts, security in access to wireless networks still presents some deficiencies or weaknesses. The use of new protocols (proposed for the WPA and 802.11i solutions) improves some problems existing in Wi-Fi security protocol versions (such as confidentiality or authentication problems in WEP). However, in terms of user authentication, these methods suffer from the same authentication problems as conventional systems: in the most widely used case (use of user name and password), the fairly common problem of the user forgetting his password occurs. Furthermore, a weakness of this authentication system is identity theft or borrowing, i.e., a third party can use the user name and password assigned to a user with permission (with or without the express help of the user). This weakness is mainly due to how easy it is to communicate said information to third parties. Other authentication methods used to try to solve this drawback are biometric authentication and token- or credential-based authentication. However, these methods also present problems: biometric authentication greatly complicates the system, especially already deployed systems, because specific hardware capable of reading the biometric characteristics of the user (fingerprint reader, iris reader . . . ) is required, not to mention the different problems of falsifying or fraudulently copying biometric data to pass oneself off as a user with permissions (there are multiple works in the state of the art studying these problems, being a currently open line of work). In terms of authentication systems based on something the user has (token or certificate) they have the problem of being easily lent to third parties, or the problem that they are stolen.

As a possible solution to security problems associated with wireless networks, has been proposed the use of the location information (where the user is located) as an extra factor to take into account in authorization or access control process. This allows extending security to the physical level (for example, for controlling unwanted coverages and access of uncontrolled equipment) compared to other existing solutions mainly based on the authentication at the network level.

Though there are some proposals in this area, there are clear problems which have not been solved by current solutions, namely:

Problem of privacy of the location information on the user: since it is a private datum, it must be assured that the information of where the user is located is used solely and exclusively in the network security and access process. It is necessary to introduce a mechanism assuring said user privacy.

Problem of system flexibility: so that the system can be used in multiple scenarios, it is necessary to include a mechanism which allows separating the system from the location method. Current systems are mainly based on the radio frequency signal sent by the user, not allowing the use of other technologies which could be of greater interest or simpler or more economical to apply.

Problem of access from unidentified, borrowed or stolen equipment: the solutions presented are mainly based on using only the location information, making them vulnerable to attacks by users who can access the secure areas (visits, people who have invited themselves in . . . ). The most complete solution allows identifying the client equipment or terminal (by means of data such as the MAC of the equipment), but even said information can be falsified, or in the worst case scenario, the system will be vulnerable to access using stolen equipment or equipment that has been left in secure areas. A mechanism avoiding said problem, identifying the user and no the equipment from which access is performed, is necessary.

European patent application EP 1720370 proposes a more versatile scheme concerning the use of the location information in controlling access to resources through wireless networks. In this case, access to resources is controlled, which allows differentiating between the permitted/denied resources, and a dynamic method for assigning privileges is used. The patent application claims performing this dynamic assignment of permissions or privileges depending on two parameters: the location of the wireless client or equipment and the identity thereof. Despite the clear improvement that this patent application involves compared to other solutions from the state of the art, it has a series of unresolved problems. Firstly, the claimed method does not consider including user (and not equipment) identification and authentication as a parameter for selecting the dynamically assigned permissions. This involves reducing the capacity of selecting the security level in the access to resources, since it does not allow selecting the access depending on the user (or his profile) but rather only depending on the equipment being used, when actually in real life, permissions are generally granted to people. On the other hand, the patent application specifies its operating method basing the location on the radio frequency signal transmitted by the user, which clearly limits the type of location system to be used, not allowing the use of other methods (such as infrared, RF tags, etc.), which may be more appropriate according to the wireless infrastructure and the type of environment in which it is applied. Furthermore, the patent application describes that the request to select access privileges and control is done using the wireless access points or routers behind them, which means that access points or routers specifically designed for this purpose (modified) are required; this hinders installation in already deployed networks and increases the cost of the solution. A solution that does not depend on the installed hardware equipment is desirable.

It is therefore clear that there are several problematic points to be solved in the state of the art.

DESCRIPTION OF THE INVENTION

The object of the present invention is to improve security in data networks with wireless access, particularly in Wi-Fi networks, described in the set of standards 802.11, including several parameters giving information on the identity of the user and his context.

To that end, according to one aspect of the invention, a method according to independent claim 1 is provided. The dependent claims include particular embodiments of the invention.

To achieve this and according to the principles of this invention, a network resource access control module separates the wireless network and other non-secure equipment from the secure network which contains several resources with different security levels. Said resource access control module dynamically controls the communications to and from the secure network, such that only those users with the corresponding permissions can send and transmit packets to/from a certain destination/source or secure resource. To that end, firstly a process of user identification and authentication is performed, and once said user has been correctly authenticated and there is confidence in his identity, user packet filtering is performed depending on a series of dynamically changing rules.

The user permissions are defined depending on a set of parameters, such as the user profile to which said user identity belongs and context and/or user status-related information. Said information can be the profile of the area or the current location of the user.

Said context and user status-related information can comprise other parameters which can be used together with the foregoing to select current user permissions, such as the analysis of the expected behavior of the user, the time and day of access, etc. This set of parameters constitutes the characteristics vector of the user from which a specific module, herein called dynamic permission management module, defines which permissions are assigned to the user. Said module can also be integrated in any of the modules forming the network (for example in the user authentication module, etc.), without significantly changing its operation. The characteristics vector dynamically varies in real time, since said characteristics can change. Thus, if the user changes the area in which he is physically located, his characteristics vector will also change, and with it his resource access permissions.

The permission corresponding to each characteristics vector is defined previously in the system in a multidimensional permission assignment table. Said table univocally defines which permissions must be assigned to a user depending on his characteristics vector. This description could also be done by means of rules previously defined in the system. These rules or table must be detailed in a stage prior to the stage of operation of the system, i.e., in a stage of configuration, and must comply with the security policy of the network in which the mechanism operates or the system implementing it is installed.

The permission management module is the responsible for dynamically selecting the current permission of each user at all times, and for informing the secure resource access control module so that it may act accordingly. The permission is recalculated provided that the characteristics vector of the user varies. The information forming the characteristics vector is sent to the management module through different modules which are responsible for calculating or measuring the parameters forming said vector.

The parameters shaping the characteristics vector of the user contain information on the identity of the user and his context and/or status. Specifically, and according to the principles of a preferred embodiment of this invention, two of the parameters used are the user profile and the profile of the area where the user is located. However, it is emphasized that other parameters can be included in said characteristics vector, such as the analysis of the expected behavior of the user, the time and day of access, the confidence in the identity of the user, the access point from which the network is accessed, the probability of success in the location estimation, etc.

The user profile indicates the type of user involved, which is associated with a series of privileges or permissions for a determined value of the remaining parameters of the characteristics vector (for a determined location, etc.). The possible user profiles are previously defined in the stage of configuration of the system by the administrator and allow distinguishing between groups of users with respect to which a distinction of privilege or permission levels is to be made. A corresponding unique user profile corresponds to a certain user identity. However, several user identities can belong to the same user profile. The identity-user profile correspondence is defined in a table or database, in the stage prior to user registration. The permission management module consults said table to obtain information on the user profile once the user identity is known. The information on the user identity is obtained using an authentication server, which allows assuring with a certain degree of confidence that the user is who he says he is. To authenticate the user, different authentication algorithms based on methods such as user ID and password, biometry, identity certificates or tokens, etc. can be used.

The profile of the area indicates what type of location the user is located in. Several profiles of the area in the system, corresponding with the possible security levels according to the area in which the user is located, which are to be considered are defined. Said definition is performed in the stage of configuration, prior to the operation. Each possible actual location in the operating environment (building, offices, etc. . . . ) must correspond with a single profile of the area, although each profile of the area can group together several locations or areas. Information on the profile of the area is obtained by the dynamic permission management module using a module which offers location-related information, protecting the privacy of the users, referred to as a location privacy module. This module, independent of the permission management module, offers current location-related information on a user, but without revealing the actual location of the user, rather only indicating the profile of the area in which the user is currently located. The central system thus never knows the actual location of the user, rather only the type of area in which he is located, thus assuring the privacy of the user.

The location privacy module obtains the location information on a user by using one or several location servers, each based on a certain location system. Said server or servers are independent of the access system, so they can be based on any location technology which is considered suitable for the application environment. The complete solution is thus independent of the location technology used. By way of example, location solutions based on the Wi-Fi signal itself sent by the user equipment, on infrared, on RFID (Radio Frequency Identifier) of a tag adhered to the equipment, etc., can be used. The location privacy module also accesses a table or database in which the correspondence between the actual areas or locations existing in the environment and the profiles of the area is defined. Said table is defined in the stage of configuration of the system. Using the location information on a user obtained from the location server, it is converted to a profile of the area, which is the information sent to the permission management module.

Preferably, the method according to the invention is implemented by means of a computer program.

These and other aspects of the invention will become evident from and will be clarified with reference to the embodiments herein described below.

BRIEF DESCRIPTION OF THE DRAWINGS

Other features and advantages of the invention will become clearer from the following description of an embodiment provided by way of non-limiting illustration with reference to the attached drawings.

In all the figures, similar reference numbers refer to similar elements.

PREFERRED EMBODIMENTS OF THE INVENTION

According to an embodiment of the invention, the security of wireless networks, particularly of Wi-Fi networks, is improved by combining the identity information on the user with context and/or user status-related information. Said information can be the profile of the area or the current location of the user. Said context and/or user status-related information can comprise other parameters which can be used together with the foregoing to select the current user permissions, such as the analysis of the expected behavior of the user, the time and day of access, etc. Said information is used to select a determined network resource access permission which varies dynamically as the user parameters vary. Depending on the permission, the passage of the user packets directed to or received from a determined network resource or equipment is allowed or denied.

Figure 1:
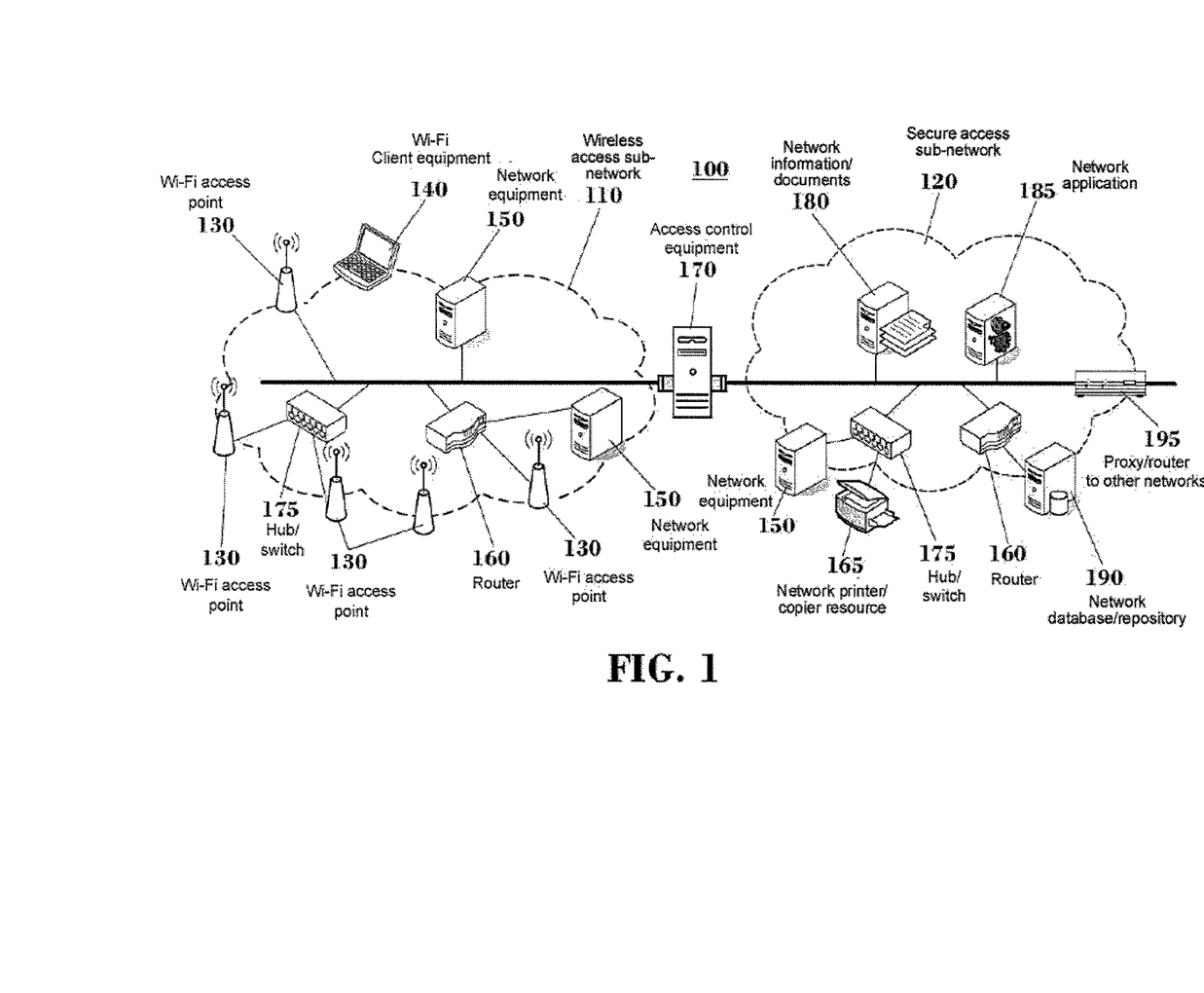
FIG. 1 shows a network architecture separated into two sub-networks, a wireless access sub-network and a secure sub-network.

The general scenario of the invention herein presented is based on the explicit separation of the communications network into two sub-networks: a secure sub-network (which includes the resources to be secured) and a wireless access sub-network, which includes the wireless access points or equipment. The secure sub-network is wired to prevent the weaknesses of wireless networks. FIG. 1 depicts this scenario. In a preferred embodiment, the wireless access is performed through a Wi-Fi network based on standard IEEE 802.11. However, the generalization to other types of wireless networks (for example, Bluetooth, Zigbee, etc. . . . ) is direct, simply requiring said wireless network to enable authentication of the users connecting to the network.

FIG. 1 shows an architecture of a system 100, in which the separation into two sub-networks necessary for the application of the proposed invention has been specified. The network is formed by two sub-networks and an equipment separating them:

A wireless access sub-network 110. This is a sub-network through which the users connect with wireless equipment. The resources or equipment connected to this network are not protected by the solution according to the invention.

A secure access sub-network 120. This is a sub-network in which the resources and equipment of the network the access to which is to be controlled are located.

The conventional equipment forming the wireless access network is included in the wireless access sub-network, which is a Wi-Fi network based on standard IEEE 802.11 for example. The typical elements for a Wi-Fi network are presented in the figure: Wi-Fi access points 130, routers 160, hubs/switches 175 and other possible network equipment 150 (such as servers responsible for the DHCP protocol, etc.). The client equipment 140 connecting to the wired network through one of the access points of the Wi-Fi network is also included. There can also be Wi-Fi access points without a wired connection to the network which communicate wirelessly with another one of the access points that is connected by cable, or with another wireless device arranged for that purpose.

The Wi-Fi network must consist of at least one wireless access point, although it is known that typical Wi-Fi networks generally consist of several access points. It is clear that access to the wired network can also be done by means of other equipment connected via cable, however this invention relates to users accessing the network through wireless access.

Several examples of network resources to be secured have been included in the secure access sub-network: network information 180, network application 185, network equipment 150, network printer/copier resource 165, network database/repository 190. Proxy/router 195 equipment for interconnecting with other networks (for example, Internet) is also included. Other network resources can be included, the only requirement for the invention to be applicable is being able to identify said resource with an IP.

The figure also specifies the existence of equipment or a module separating both networks, referred to as access control module or equipment 170. Said equipment must control the packets coming from or directed to the equipment accessing the network through wireless access, according to the principles of this invention.

Said equipment 170 dynamically controls access by wireless users to secure network resources. The equipment or module 170 performing the dynamic control must consist of an input and another output network interface, as well as calculation capacity to perform said control in real time. It is clear that since a high calculation capacity may be required, said module can be formed by several pieces of equipment operating in parallel. In a preferred embodiment, said module is a conventional server with the corresponding computer software. In another embodiment, said module can be equipment with several Field Programmable Gate Array (FPGAs) cards with a high calculation capacity, and the corresponding control hardware and software.

Figure 2:
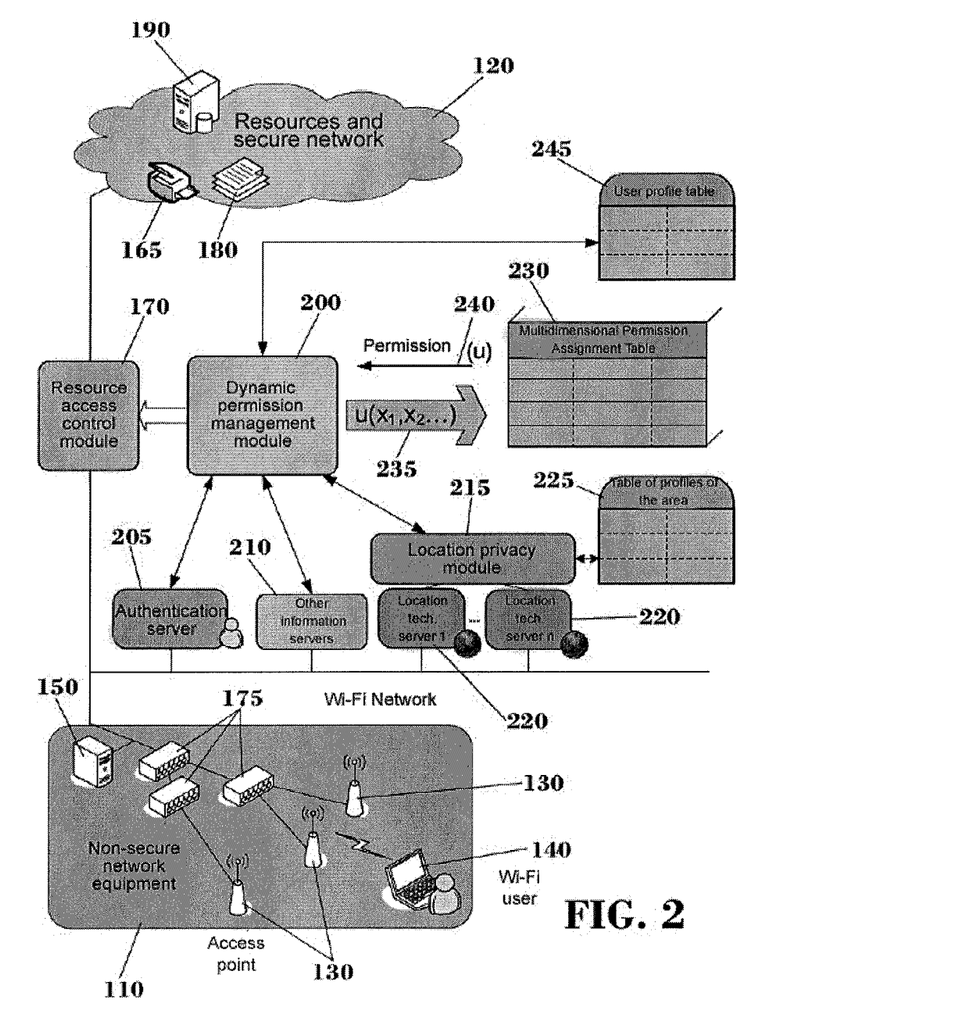
FIG. 2 shows a modular scheme of an embodiment of the proposed invention.

FIG. 2 depicts a modular scheme of an embodiment of the proposed invention. It consists of several modules performing the method detailed below. Said modules are implemented on one or several pieces of physical equipment (typically PCs or servers) in which a computer program performing the specified process is executed. Said equipment is not specified in this figure since the purpose is to show the modular architecture of the method and not a possible physical solution of the implementation.

The solution consists of three main management and control modules, of several modules or servers and of three main data tables.

The management and control modules indicated in FIG. 2 are:

Resource access control module 170: module performing the control of packets from/to the client equipment of the wireless network. The control is dynamic and depends on several parameters which may vary over time, according to the principles of the invention.

Dynamic permission management module 200: module in which the information on the user status is processed at all times, and the resource access permission for each of them is decided according to said information. This module is responsible for informing resource access control module of the changes in permission so that it may apply them.

Location privacy module 215: module responsible for performing the requests for current location information on the users from the corresponding location servers and translating the location information into generic profiles to assure the privacy of this user datum. It further allows generalizing the location information and using multiple location systems in the solution.

The information and authentication servers depicted are:

Authentication server 205: responsible for managing the user authentication every time he connects to the wireless network, informing on the identity thereof and his active connection.

Location servers 220: are responsible for calculating the location of the user by means of the corresponding method. There must be at least one location server, but more servers or systems are allowed to allow using multiple location technologies.

Other information servers 210: other servers or modules generating information on the user status or his context can be included in the case of using other parameters to select the permission of user, according to the characteristics vector 235, as will be described below.

The main information tables included in the invention and depicted in the figure are:

Table of profiles of the area 225: relates the physical areas in which the user can be located (and which are controlled by the system) and profiles of the area, indicating the security level to be assigned to each area. It is consulted by the location privacy module and is defined in a prior stage of configuration of the system.

Table of user profiles 245: relates the univocal user identifiers with one of the user profiles, indicating the privilege or access level which said user profile or type will have.

It is consulted by the dynamic permission management module and is defined in a prior stage of registration of users.

Multidimensional permission assignment table 230: relates the characteristics vector of user 235 (input) with the permission 240 which is assigned to said vector (output). It is consulted by the dynamic permission management module and is defined in a prior stage of configuration of the system.

Figure 3:
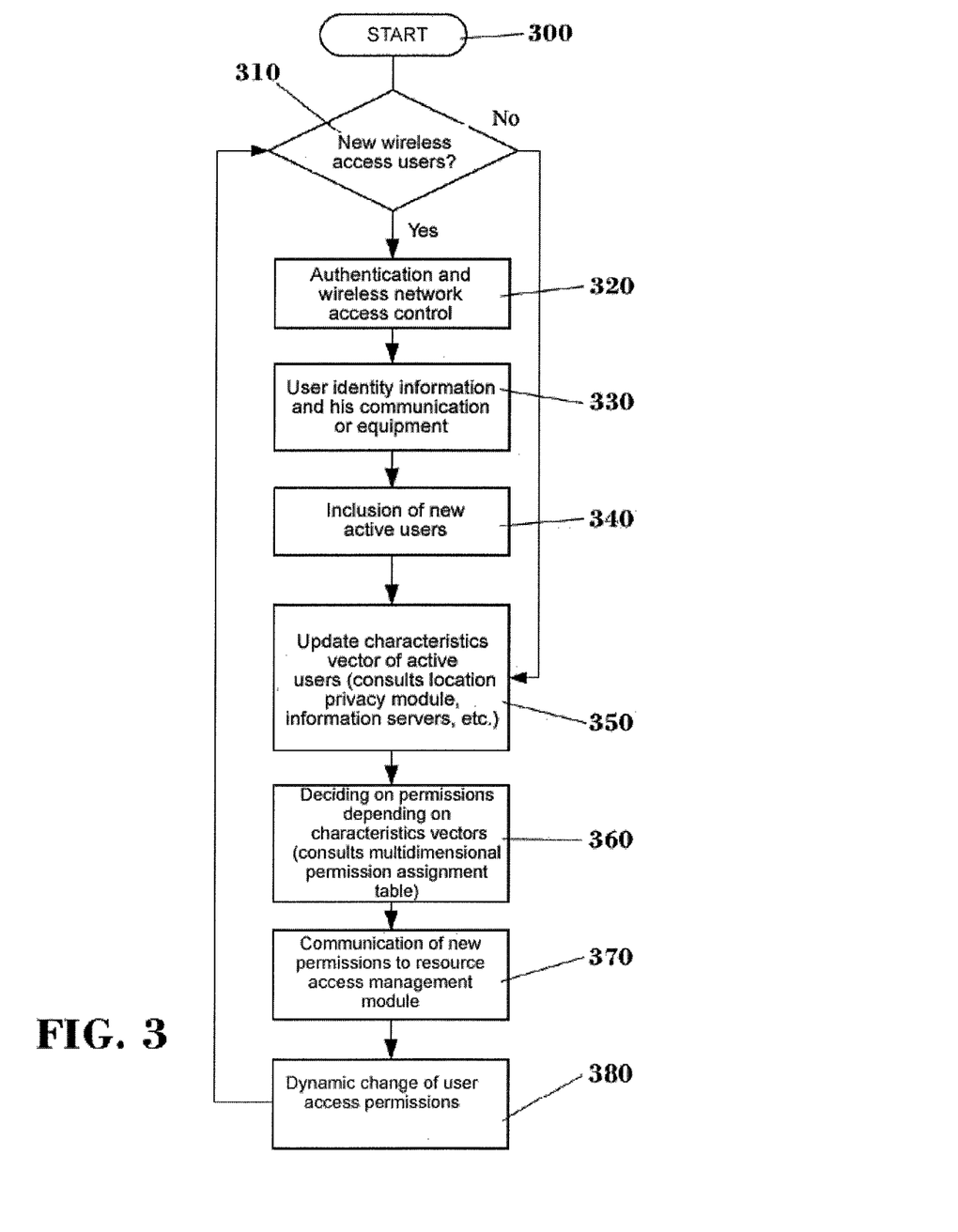
FIG. 3 shows the general process according to the principles of an embodiment of the invention.

FIG. 3 depicts the general process according to the principles of this invention (generic case). After the start 300, it is checked if there are new users requesting access to the wireless network (step 310). In a first instance, the authentication server is responsible for the authentication and the control of the access of the users to the Wi-Fi network (step 320). The control of said access to the wireless network is performed solely based on the identity of the user. When a user tries to connect to the Wi-Fi network through an access point, the latter blocks data traffic of the user, allowing only authentication traffic to and from the authentication server. The access point asks the user to send his credentials to connect to the network. In the preferred embodiment, these credentials will consist of a user identifier (login) associated with a password, although credentials of another type can be considered, such as digital certificates, tokens, or biometric data. Once the access point receives this information on the user, it forwards it to the authentication server. The server receives this information and accesses a user database or repository to obtain the credentials of the user who requested the connection. The authentication server compares the credentials sent by the user with those it has obtained from the database or repository and sends the result of this comparison to the access point. If the credentials coincide, the access point allows the user to connect to the network and unblocks the data traffic; otherwise, the access point will deny the connection and the user will be disconnected. If the user previously refuses to send his credentials, the access point would automatically deny connection. In this case the authentication server would not intervene in the process.

The method described above is implemented in standard IEEE 802.1X. Though it was developed previously, it was adopted in standard IEEE 802.11i to provide a framework on which to deploy control, authentication and key management access mechanisms. As mentioned above, the control mechanism defined in standard 802.1X acts in the access point by blocking the traffic coming from the client equipment, allowing only the authentication traffic between the client and the authentication server. The exchange of credentials between the client and the authentication server is performed through the EAP protocol (Extensible Authentication Protocol), defined by the IETF (Internet Engineering Task Force) in RFC (Request for Comments) 3748. EAP is a flexible protocol used as a framework for supporting multiple modes of authentication (for example, based on user-password, digital certificates, smart cards, single-use passwords . . . ). The access point does not intervene in the process of authentication, it is limited to forwarding the EAP traffic between the client and the authentication server.

Details about the communication between the access point and the authentication server are not included in standard 802.1X. However, it is admitted de facto that the EAP traffic is encapsulated using RADIUS (Remote Authentication Dial-In User Server). RADIUS is a protocol defined in RFC 2865 used to carry out processes of authentication, authorization and accounting, which are known as AAA (Authentication, Authorization and Accounting) processes in the specialized literature.

In the preferred embodiment, the access points and the authentication server implement the RADIUS protocol to carry out the processes of access control and user authentication, though other protocols can be used, such as DIAMETER, which is mentioned in standard 802.1X.

If the method of authentication described above concludes successfully, the user is connected to the Wi-Fi network through the client equipment. This means that the user equipment is allowed to communicate with other equipment in the non-secure network, the wireless access network. However, by default it is not allowed access to the resources of the secure network (though by default this mode could be otherwise configured, like access to a quarantine sub-network, etc.).

After the correct authentication, and according to the principles of this invention, the correct user identity and authentication information becomes available, such that the dynamic permission management module can know said information. The authentication server further provides information to identify the communication of said user (step 330). In a preferred embodiment, the authentication server provides to that end identification information on the equipment from which the user has connected. In another embodiment, the communication of the user (rather than the physical equipment being connected) is directly identified with the IP address assigned upon granting Wi-Fi access.

The identification information on the user equipment can be offered in several ways. In a preferred embodiment, the equipment of the user is identified by means of the MAC address of the Wi-Fi interface, although other methods could be used to identify the equipment, such as that offered by a TPM module (Trusted Platform Module) included in the equipment or others.

Figure 4:
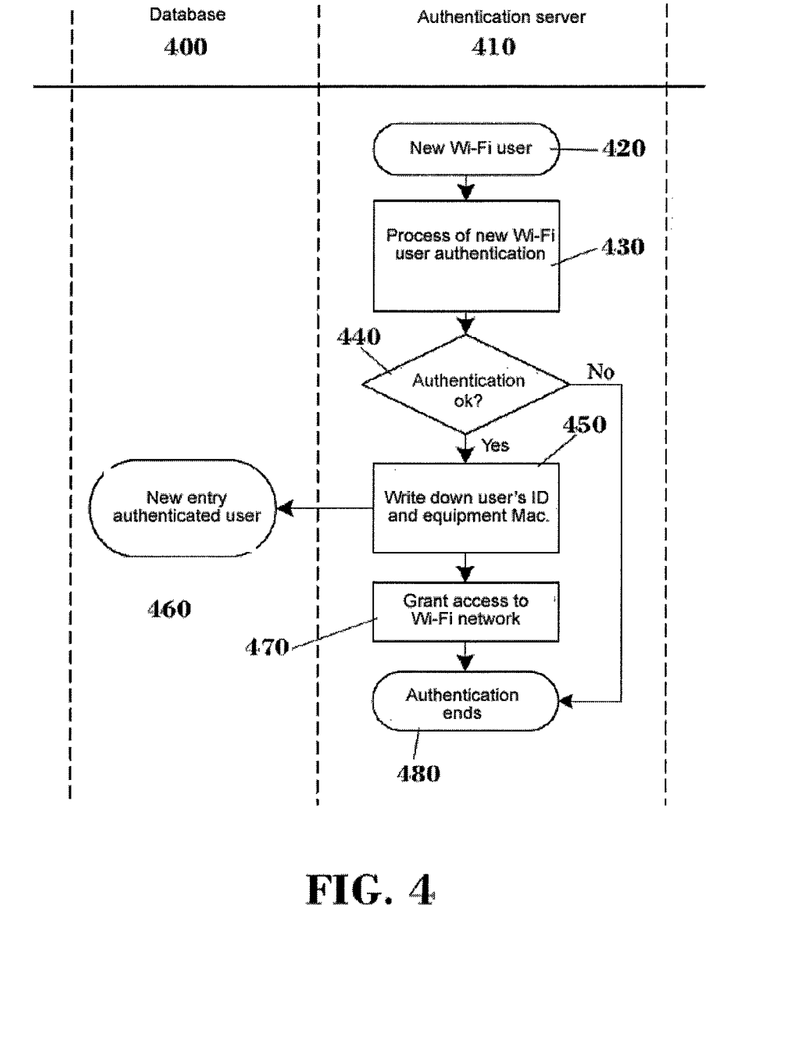
FIG. 4 depicts the process of user identification, authentication and authorization upon accessing the Wi-Fi network according to a preferred embodiment of the invention.

FIG. 4 depicts the process of user identification, authentication and authorization upon accessing the Wi-Fi network according to a preferred embodiment in which the authentication module communicates that a new user has been authenticated through the inclusion of a new input in a table of a database, which will be monitored by the dynamic permission management module. In this embodiment, the information on the user that is included is his unique identifier and the MAC of the wireless adapter used in the communication.

Column 400 depicts the steps executed by the database and column 410 depicts the steps executed by the authentication server. In step 420, a new Wi-Fi user is presented who attempts to access the network. During the process of authentication 430, together with the credentials of the user, the authentication server receives from the access point to which the user connects additional information on the equipment with which he is trying to access the network, specifically the MAC address of the Wi-Fi adapter. Once it has been determined that the process of authentication has concluded successfully (step 440), the same server accesses the database and records the MAC address associating it with the identity of the user who has been authenticated (steps 450 and 460). The management module monitors the database such that it detects the moment in which the authentication server carries out this operation. Finally, the server notifies the access point that the authentication has been correct and the latter allows the user to connect to the network (step 470), concluding the process of authentication (step 480). In the event that the credentials of the user are not correct (step 440), the server will notify the access point of this circumstance, which will deny the user access to the network, considering the process of authentication (step 480) to be concluded.

In another embodiment, the authentication module communicates directly to the dynamic permission management module that a new user has been correctly authenticated, indicating the identity of the user and of the client equipment or the identification of the communication. Said communication can be performed through different methods, such as the use of sockets, webservice technology, or other communication protocols between applications.

In another embodiment, the dynamic permission management module periodically queries the authentication module to ask about the new users authenticated in the system. In this case, the authentication module must keep a table where it stores the identity of the user and his client equipment or the identification of the communication.

The dynamic permission management module is the central element of the invention, where the main part of the system decision logic resides. Its purpose is to decide which access permissions the connected users have at all times based on their characteristics vector. As explained above, the management module is capable of detecting that a user has been authenticated and connected correctly by consulting the database, or periodically asking the authentication server, or the authentication server itself can send a notification to the management module notifying of this circumstance. Once the management module has detected the connection of a new user, it initializes the necessary associated values and characteristics vector (step 340), and goes on to control the variable parameters present in the characteristics vector (profile of the area in which he is located, timetable restrictions or other control parameters), periodically updating them (step 350). The management module carries out this control with all the users that are connected at all times. To update the value of the parameters of the characteristics vector, the management module consults the information servers or the information they generate (in tables, repositories, databases, etc.). These information servers include the location servers. Once the characteristics vectors of all the users are updated, the management module consults the multidimensional permission assignment table to know which permission corresponds to each user according to the value of the parameters of his characteristics vector (step 360). The result obtained is communicated to the access control module (step 370) so that it can act accordingly changing the access permissions of the users (step 380). The steps described above are constantly repeated in an iterative process. It is obvious that this same process can be performed by updating the characteristics vector and consulting the multidimensional permission assignment table user by user, leading to the same result. Depending on the specific manner in which said consult is performed, one or the other method will be more efficient and therefore preferred.

Figure 5:
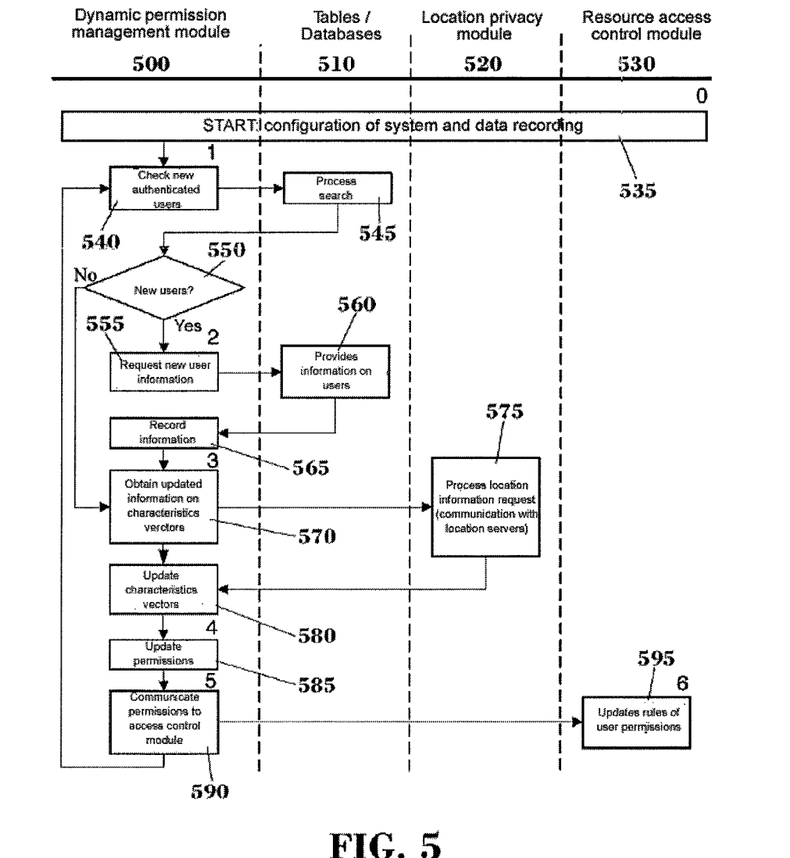
FIG. 5 shows the dynamic permission management process and update of the permissions, according to a preferred embodiment of the invention.

FIG. 5 depicts the dynamic permission management process and update thereof according to a preferred embodiment, in which the dynamic permission management module obtains the information on new connected users by means of monitoring a table in the database. Furthermore, the characteristics vector is formed in this embodiment by the user profile and the profile of the area, such that only this latter parameter varies over time in a communication, and this is what must be monitored by asking the location privacy module.

Column 500 depicts the steps executed by the dynamic permission management module, column 510 the steps executed by the tables/database, column 520 the steps executed by the location privacy module and column 530 the steps executed by the resource access control module. After an initial step 535 of configuration of the system and data recording, the dynamic permission management module checks (step 540) if a user has recently been authenticated. It does this by periodically checking a table in a database, in which the authentication server has recorded the user identifier and the MAC address of the Wi-Fi adapter used in the current communication, in the moment in which the user has been correctly authenticated. The database processes the search (step 545). In addition to these two values, the permission management module requires knowing other parameters associated with the user: the profile of the user, the location system associated with the user, and the possible information required by the location system. Said data are associated with a user identifier in a prior process of user recording (which can be the same that is used to record the users in the authentication module). In this embodiment, said information is recorded in a table of the database. Thus, when the management module detects that there is new input in the table of authenticated users (step 550), it includes the new user in the system as active, requesting the information it needs about him (step 555) from the database: the univocal identifier of the user and the MAC address of the Wi-Fi adapter (data filled out by the authentication server in a table of the database), the location system assigned to the user and the necessary location information (data which was assigned in the process of recording, in another table of the database). The database provides the information to management module (step 560) and the latter records it (step 565).

The invention contemplates the use of several location systems, among which are ILS (Indoor Location Systems), or other location systems such as those based on cell networks, improved GPS, etc. Since the invention applies to closed areas (buildings, etc.), the location system must be capable of operating indoor, therefore the conventional global positioning systems are not valid. The users will have one or other location system assigned according to their characteristics or their needs. In order to avoid information inconsistencies, each user can only have assigned one location system (although obviously many users can have the same location system assigned, if it supports locating multiple users).

In a preferred embodiment, for each user a table of a database indicates which location system he uses, as well as the information that the ILS needs to locate him (physical direction or identifier of the location device employed). Therefore, the location data allows management module to know which ILS must be consulted to locate each user and the information that it must provide it.

Once the management module has the information on the new user authenticated, it initializes for the first time his characteristics vector (step 565), which in this preferred embodiment is made up of his user profile and the profile of the area in which he is located. Other embodiments may include other fields, such as the method of authentication used (or its security level assigned), the reliability of the location (% of probability of error in the location, or confidence in the location system), a parameter of analysis of the expected behavior of the user, the time and day of access, etc. The user profile is initialized to the corresponding value indicated in the table of the database where the users registered in the system are stored (in the process of prior registry, aforementioned).

After having checked and included the new users authenticated, the management module updates the variable parameters of the characteristics vector of all the users connected (new and old). In this preferred embodiment, the only parameter to be updated is the profile of the area in which each user is, since the user profile remains fixed while the user is connected. To obtain the profile of the area, the management module communicates (step 570) with the location privacy module and sends it the data required for the location of the user, i.e.: the ILS used and the identifier of the location device of the user (for example, the identifier of a tag in the case of a RFID system, or the MAC of the Wi-Fi adapter itself in the case of an ILS based on this technology). The location privacy module will return (step 575) the profile of the area in which the ILS located the user, together with a timestamp indicating the date and time of that location. It must be noted that the management module does not know the specific location of the user, but only which type of area it is (for example: common area, restricted access area, unsafe area . . . ). This level of information is sufficient for the selection of permissions, and allows ensuring a certain level in the privacy of the location information on the user.

In the following step of this embodiment, the management module evaluates the validity of the location information provided by the location privacy module. To that end a time threshold is established as a parameter configurable in the management module. The validity of the location information is determined based on the relationship between the configured time threshold and the timestamp provided by the location privacy module. Depending on the obtained result, two statuses of the user can be considered: locatable and non-locatable. If the difference between the current time and the timestamp is greater than the time threshold, the location information is considered obsolete and therefore non-valid, the user will be in a non-locatable status. In contrast, the location information is considered valid if the difference between the current time and the timestamp is less than the time threshold, in this case, the user will be in a locatable status. If, for any circumstance, the location information on the user is not available, he will be considered to be in a non-locatable status.

Once the status of the user is determined, the management module updates the permissions corresponding to each user (step 585) and sends the pertinent commands to the resource access control module (step 590). These steps will only be performed if the user status or his characteristics vector have changed since the last time it was checked. If the user was in a non-locatable status and remains in said status, the management module will not perform any action. If the user goes from a non-locatable status to a locatable status or, been in a locatable status, changes his characteristics vector, the management module will consult in the multidimensional permission assignment table which permission corresponds to the user depending on his characteristics vector (which in this case will be up made of his user profile and the profile of the area in which he is located). The management module will send to the resource access control module the permission assigned to the user together with the MAC address of his Wi-Fi adapter. With this information, the access control module updates the user permissions rules (step 595).

According to the principles of this invention, the permission to be assign to the user if one of the parameters of the characteristics vector is not available can generally be configured by the administrator, in a prior stage of configuration. In a preferred embodiment, the permission assigned is not to allow his access to any resource of the protected network (secure access network). However, other options are possible, such as allowing the access only to a certain information web server, to a quarantine sub-network, etc. Thus, in this preferred embodiment, in the case in which the user goes from a locatable status to a non-locatable status, the management module sends to the access control module the MAC address of his Wi-Fi adapter indicating it to eliminate the permissions assigned to that MAC address. The default behavior of the access control module establishes a total restriction of access to the resources for those MAC addresses not having an assigned permission. Therefore, a user the location information of which is not valid or is not available will be considered to be non-locatable and will have no access to any resource of the secure network.

The location privacy module has two main functions. The main one is to keep the actual location of the users hidden, providing only information on the profile assigned to the area in which they are located, and thus ensuring the privacy of the location of the user. The second function is to work as an interface with the location systems to be used in the embodiment. The invention considers the use of multiple location systems based on any location technology considered to be suitable for the application environment. The privacy module contains the logic necessary to be adapted to the specific characteristics of each location system and obtain the required information. Therefore, it consists of a communication interface for each of the location systems to be included.

In the preferred embodiment, the request received by the location privacy module from the dynamic permission management module includes information on the location system to be consulted and the device to be located (for example, the identifier of a tag in the case of an RFID system, or the MAC of the Wi-Fi adapter itself in the case of an ILS based on this technology). The location privacy module consults the location system indicated in the request specifying the device to be located. As a response, it will receive the identifier of the area (for example: "room1", "stairs", etc.) in which the location device assigned to the user is, and the timestamp indicating the time in which the ILS obtained said information. The location device or method is assigned to the user in a prior process of user registration. Then, the privacy module obtains from the table of profiles of the area, the profile of the area corresponding to the identifier of the area of the user. The privacy module responds to the request of the management module specifying the profile of the area in which the user was located and the timestamp.

The resource access control module contemplated in the invention is ultimately responsible for filtering the network traffic flowing between the non-secure network (Wi-Fi network and other non secured equipment) and the secure network, containing several resources with different security levels. The filtering criteria are independent for each user and change dynamically depending on the commands received from the management module. When the management module decides to change the permission assigned to a user, and therefore the resources to which he can access, this is communicated to the access control module specifying the assigned permission and a parameter indicating the connection of the user. Each user permission is indicated with a univocal identifier. The access control module maintains a relationship between the user permissions contemplated and the resources to which each of the permissions gives a right. Said relationship is defined in a process of configuration prior to the operation, although it can be varied if necessary (adding, deleting or changing permission identifiers) and its resources associated.

In a preferred embodiment, each resource is defined by its IP address (in the format of X.X.X.X, wherein X is a number between 0 and 255.). In the case in which a resource relates to a set of IP addresses inside one and the same sub-network, the latter could be indicated by means of the IP address accompanied by the prefix of the sub-network (in the format of X.X.X.X/Y, wherein Y is a number between 0 and 32 and it indicates the prefix of sub-network). In another embodiment, the resources are defined by their hostname. The connections of the users are identified by the MAC address of the Wi-Fi adapter with which they are connected to the network. In other embodiments, other ways for identifying the connections, for example through the IP address, can be used. For each of the established permissions, one or more IP addresses (or of sub-network) can be specified for those resources to which the permission allows access to. The default filtering policy of the access control module is not allowing any type of traffic between the two networks (non-secure and secure). Each user will only have access to those resources the IP address of which has been explicitly defined in the permission assigned to said user at that time. The users who do not have any assigned permission will not be able to access to any resource of the secure network.

In this preferred embodiment, the filtering carried out by the access control module is based on packets stamping. For each of the established permissions as many filtering rules are created as IP addresses are defined in said permission. Each rule is defined such that it only allows the passage of the packets having a determined stamp and they are directed the corresponding IP address. All the rules defined for one and the same permission will have the same stamp identifying the permission univocally. These filtering rules remain constant as long as the permissions which have been defined do not change.

When the access control module receives a command from the management module indicating the permission to be assigned to a determined MAC address, a packets stamping rule is dynamically created. The function of this rule is to stamp all the packets the source or destination address of which coincides with that MAC address. The stamp will coincide with the stamp that identifies the permission assigned to that MAC address.

The access control module has a record of the permissions assigned to each of the MAC addresses such that when the management module assigns a new permission to a MAC address, the control module updates the rule applied on said address so that the stamp coincides with that of the assigned permission.

As discussed above, in this preferred embodiment the default filtering policy of the access control module is not allowing any type of traffic between the two networks (insecure and secure). Only those MAC addresses assigned with a permission (and therefore a packets stamping rule) will have access to the resources of the secure network defined in the assigned permission. Therefore the non-stamped packets will not pass into the secure network.

The invention includes a communication interface for administration such that an administrator can configure the different options of the invention and register, cancel or change characteristics of the users of the system. Said interface allows graphically depicting the status of the network, the assigned permissions and the users registered in the system, as well as the activities at all times.

In a preferred embodiment, said graphical interface consists of a user and permission management section and another monitoring section. The user and permission section allows registering users into or cancelling users from the system, or varying the assigned characteristics (like the type of ILS assigned, the user profile, etc). It also allows defining the permissions to be assigned depending on the characteristics vector and the resources available for each defined permission. The monitoring section shows the status of the system at all times, including anomalous situations (such as when users cannot be located for a long time period, etc). It can also show, upon request, a map of the area covered by the Wi-Fi network where the defined areas are presented and a list of the active users together with their assigned permissions. Finally, it also allows showing a list of events in the system and the time at which they were produced (changes of user areas, changes of permission, etc), as well as the option of creating an archive to record events. In other embodiments, other information or sections, such as the definition of areas, information of the equipment in the network, etc can be available.

The industrial application of the invention is for controlling the access to network resources for the case of networks with wireless access in a secure, dynamic manner and taking into account multiple factors, among which the identity of the user and his location stand out.

The main example of case of use is the improvement of company security networks when including a wireless access. It also improves the access control to wireless networks for areas or buildings with wireless network, like hotels, embassies, airports, etc, in which offering different levels or resource access policies is required.

Although the invention has been illustrated and described in detail in the drawings and in the above description, such illustrations and descriptions must be considered illustrative or exemplary and non-restrictive; the invention is not limited to the disclosed embodiments.

For example, although the preferred embodiment of the invention uses the IEEE 802.11 protocol, the invention can be extended to other types of technologies of non-cellular wireless access, such as WiMAX or others to be identified or defined in the future.

Other variations to the disclosed embodiments can be understood and carried out by those skilled in the art when performing the claimed invention, studying the drawings, the description and the attached claims. In the claims, the expression "comprising" does not exclude other elements or stages, and the indefinite article "an" or "a" does not exclude a plurality. A single processor or other entity can fulfill the functions of several elements mentioned in the claims. The simple fact of certain measures being mentioned in dependent claims different from one another does not indicate that a combination of these measures cannot be used in a more advantageous way. A computer program can be stored/distributed on a suitable medium, such as an optimal storage medium or a solid state medium together with, or as part of, another hardware, but it can also be distributed in other ways, such as through Internet and other wired or wireless telecommunication systems. Any reference sign in the claims must not be interpreted as limiting the scope.

What is claimed is:

1. A method for controlling access to secure network resources through a wireless network in a different manner according to the security level required for each resource, in which are assessed a series of security parameters associated with a previously authenticated user, comprising:
   obtaining information on the identity of each user connecting through a wireless device using a prior process of authentication;
   obtaining context-related information and/or the user status;
   generating a characteristics vector for each user, which comprises the context and/or user status-related information and a user profile, depending on the identity of the user;
   assigning permissions to each user, determining the type of secure network resources each user is allowed to access depending on their characteristics vector;
   performing a secure network resource access control, allowing the transfer of data only to/from resources allowed for each user, depending on the permissions assigned;
   updating the characteristics vector, specifically, the context and/or user status-related information, and iteratively repeating the prior steps of assigning permissions to each user and of performing a secure network resource access control, thus achieving a dynamic change of the type of secure network resources each user is allowed to access.

2. A method according to claim 1, wherein the context and/or user status-related information comprises location-related information on the user.

3. A method according to claim 2, wherein the location-related information on the user is information on a type of area in which the user is located obtained by means of converting absolute location information on the user.

4. A method according to claim 2, wherein a timestamp is used indicating when the location-related information on the user was obtained, and the validity of said information is determined based on the relationship between a time threshold and the timestamp.

5. A method according to claim 1, wherein the context and/or user status-related information comprises at least one of the following parameters: the analysis of the expected behavior of the user, the day and/or the time of access, the confidence in the identity of the user, the access point from which the network is accessed and the probability of success in the location estimation.

6. A method according to claim 1, wherein the identity of the user is obtained in the prior process of authentication based on a user identifier and password in a Wi-Fi type wireless network, following the RADIUS protocol.

7. A method according to claim 1, wherein an identifier of the equipment or of the communication of the user, in addition to the user identity, is obtained by using the prior process of authentication.

8. A method according to claim 7, wherein an authentication server communicates the user identity and the identifier of the equipment or of the communication of new connected users by means of including an input in a table of a repository or database, which is continuously monitored by a dynamic permission management module.

9. A method according to claim 7, wherein an authentication server sends the user identity and the identifier of the equipment or of the communication of new connected users directly to a dynamic permission management module.

10. A method according to claim 7, wherein a dynamic permission management module periodically asks an authentication server for the user identity and the identifier of the equipment or of the communication of new connected users.

11. A method according to claim 7, wherein the identifier of the equipment is obtained by using the prior process of authentication and in that the identifier of the equipment is the MAC address of the wireless network adapter of the equipment.

12. A method according to claim 7, wherein the identifier of the communication is obtained by using the prior process of authentication and in that the identifier of the communication is the IP address assigned in the wireless network to the user after the authentication.

13. A method according to claim 1, wherein the type of secure network resources each user is allowed to access depending on the characteristics vector of user is determined by consulting a multidimensional permission table which is specified in a prior process of configuration and which univocally relates each possible characteristics vector with a network resource identifier.

14. A method according to claim 13, wherein the network resources are defined by means of one or a set of IP addresses.

15. A method according to claim 13, wherein the network resources are defined by means of their hostname.

16. A method according to claim 1, wherein the access control is performed by means of dynamic packet stamp according to the permission assigned, depending on the MAC address of said packets, and by means of filtering said packets depending on the stamp.

17. A method according to claim 1, wherein by default, the users without assigned permission do not have access to any of the secure network resources.

18. A computer program comprising computer executable code stored in one or more computer readable storage devices and suitable for performing the method of claim 1, when said program is executed in a computer.

\* \* \* \* \*

UNITED STATES PATENT AND TRADEMARK OFFICE
CERTIFICATE OF CORRECTION

PATENT NO.       : 8,448,257 B2                                                             Page 1 of 1
APPLICATION NO.  : 13/125065
DATED            : May 21, 2013
INVENTOR(S)      : Garcia Garcia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 142 days.

Signed and Sealed this
Eighth Day of September, 2015

Michelle K. Lee
*Director of the United States Patent and Trademark Office*